United States Patent [19]

Evans et al.

[11] Patent Number: 5,466,744
[45] Date of Patent: Nov. 14, 1995

[54] POLYMERIZATION OF MACROCYCLIC POLY(ALKYLENE DICARBOXYLATE) OLIGOMERS

[75] Inventors: Thomas L. Evans, Clifton Park; Daniel J. Brunelle, Scotia; Jean E. Bradt, Esperance; Eric J. Pearce, Clifton Park; Paul R. Wilson, Scotia, all of N.Y.

[73] Assignee: General Electric Company, Schenectady, N.Y.

[21] Appl. No.: 369,986

[22] Filed: Jan. 9, 1995

Related U.S. Application Data

[63] Continuation of Ser. No. 702,577, May 20, 1991, abandoned, which is a continuation-in-part of Ser. No. 608,767, Nov. 5, 1990, Pat. No. 5,039,783.

[51] Int. Cl.$^6$ ........................................... C08K 5/16
[52] U.S. Cl. ..................... 524/714; 528/272; 528/274; 528/300; 528/308; 528/371; 528/372; 524/720; 524/792
[58] Field of Search .................... 528/272, 274, 528/300, 308, 371, 372; 524/714, 720, 792

[56] References Cited

U.S. PATENT DOCUMENTS

| | | | |
|---|---|---|---|
| 4,223,125 | 9/1980 | Bier et al. | 528/305 |
| 4,289,895 | 9/1981 | Burkhardt et al. | 560/92 |
| 4,379,912 | 4/1983 | Lu | 528/274 |
| 4,740,583 | 4/1988 | Brunelle et al. | 528/370 |
| 4,757,132 | 7/1988 | Brunelle et al. | 528/357 |
| 4,767,830 | 8/1988 | Kageyama et al. | 525/450 |
| 4,829,144 | 5/1989 | Brunelle et al. | 528/176 |
| 4,980,453 | 12/1990 | Brunelle et al. | 528/352 |

OTHER PUBLICATIONS

Ross et al., *Polymer*, 1, 406–407 (1960).
Goodman et al., Polymer, 1, 384–396 (1960).

*Primary Examiner*—Samuel A. Acquah
*Attorney, Agent, or Firm*—William H. Pittman

[57] ABSTRACT

Macrocyclic polyester oligomer compositions comprising alkylene isophthalate or terephthalate units or the like are prepared by the reaction of a diol with a diacid chloride in the presence of at least one amine characterized by substantially no steric hindrance around the basic nitrogen atom. The reaction is conducted under substantially anhydrous conditions and at a temperature from about −25° to about +25° C. The resulting macrocyclic oligomers may be converted to linear polyesters by contact with catalysts including basic reagents, stannous alkoxides, organotin compounds, titanate esters and metal acetylacetonates.

31 Claims, No Drawings

POLYMERIZATION OF MACROCYCLIC POLY(ALKYLENE DICARBOXYLATE) OLIGOMERS

This application is a Continuation of application Ser. No. 07/702,577, filed May 20, 1991, now abandoned, which is a continuation-in-part of application Ser. No. 07/608,767 filed Nov. 5, 1990, now U.S. Pat. No. 5,039,783.

This invention relates to the polymerization of macrocyclic polyester oligomer compositions, and more particularly of macrocyclic poly(alkylene dicarboxylate) oligomers.

Linear polyesters such as poly(ethylene terephthalate) and poly(butylene terephthalate) are well known commercially available polymers having advantageous properties including solvent resistance. They are normally prepared by the reaction of a diol with a functional derivative of a dicarboxylic acid, typically a diacid halide or ester.

In recent years, various new methods for the preparation of linear condensation polymers have been developed which involve macrocyclic intermediates. For example, U.S. Pat. No. 4,644,053 discloses cyclic polycarbonate oligomer compositions which may be employed in reactive processing operations such as pultrusion, reaction injection molding and resin transfer molding, and thereby converted to linear polycarbonates of high molecular weight. Cyclic polyarylate compositions having similar capabilities are disclosed, for example, in U.S. Pat. No. 4,829,144.

There have been reports of the preparation of macrocyclic poly(alkylene dicarboxylates), particularly the isophthalates and terephthalates, by conventional reactions involving diols and dicarboxylic acid chlorides or dicarboxylic acid esters, but the yields were very low unless the reaction was carried in extremely high dilution, typically no higher than 0.001M. Macrocyclic oligomers of this type have also been isolated from commercially available linear polyesters, again in very low yield. Reference is made, for example, to Wick et al., *Angew. Macromol. Chem.*, 112, 59–94 (1983); Ross et al., *J. Polymer Sci.*, 13, 406–407 (1954); and Goodman et al., *Polymer*, 1, 384–396 (1960).

The present invention is based in part on the discovery of reaction conditions under which macrocyclic polyester oligomers of this type may be obtained in relatively high yields, typically 15– 75%. The reaction employed is the condensation of a diol with a diacid chloride in the presence of a non-sterically hindered amine as catalyst, under anhydrous conditions and at relatively low temperatures. The resulting oligomers may be readily polymerized to linear polyesters.

In one of its aspects, the invention is a method for preparing a linear polyester which comprises contacting a mixture of macrocyclic polyester oligomers comprising structural units of the formula

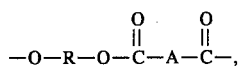

wherein R is an alkylene or mono- or polyoxyalkylene radical containing a straight chain of about 2–8 atoms and A is an m- or p-linked monocyclic aromatic or alicyclic radical, with a macrocyclic polyester oligomer polymerization catalyst at a temperature within the range of about 160°–300° C.

The macrocyclic polyester oligomers which are polymerized according to this invention may be prepared by contacting at least one diol of the formula HO—R—OH and at least one diacid chloride of the formula

under substantially anhydrous conditions and in the presence of a substantially water-immiscible organic solvent, with at least one unhindered tertiary amine; said contact being conducted at a temperature from about −25° to about +25° C.

Useful diols include alkylene glycols and polyalkylene glycols, provided the straight chain connecting the hydroxy groups contains about 2–8 atoms. Suitable alkylene glycols include ethylene glycol, propylene glycol, tetramethylene glycol, hexamethylene glycol and neopentylene glycol. Suitable polyalkylene glycols include diethylene glycol and triethylene glycol. Ethylene glycol and tetramethylene glycol are preferred.

The other reagent used to form the macrocyclic polyester oligomers is a diacid chloride containing an A value which may be an m- or p-linked monocyclic aromatic or alicyclic radical. Included are m- and p-phenylene, substituted derivatives thereof, and similarly structured cyclohexylene and cyclopentylene radicals. The m- and p-phenylene radicals, and especially p-phenylene, are preferred.

Also employed is at least one unhindered tertiary amine and a substantially water-immiscible organic solvent. The essential feature of the amine is the lack of a substantial amount of steric hindrance around the basic nitrogen atom. Preferred amines of this type are polycyclic compounds with a tertiary nitrogen in the bridgehead position, as illustrated by quinuclidine and 1,4-diazabicyclo[ 2.2.2]octane (DABCO), which have the following formulas, respectively:

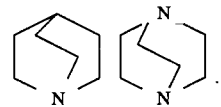

Also suitable, though less preferred because they produce the macrocyclic oligomers in lower yield, are N-methyl heterocyclic monoamines such as N-methylpyrrolidine and N-methylpiperidine, especially the former.

As organic solvents, various water-immiscible non-polar organic liquids may be employed. Illustrative liquids of this type are aromatic hydrocarbons such as toluene and xylene; substituted aromatic hydrocarbons such as chlorobenzene, o-dichlorobenzene and nitrobenzene; and chlorinated aliphatic hydrocarbons such as chloroform, methylene chloride, trichloroethane and tetrachloroethane. Chlorinated aliphatic hydrocarbons are preferred, with methylene chloride frequently being most preferred because of its availability and particular suitability. It is frequently advantageous to employ, in combination with the water-immiscible solvent, a more polar combined oxygen-containing solvent such as tetrahydrofuran in which the diol is soluble to facilitate dissolution thereof.

The molar ratio of diol to diacid chloride is preferably about 1:1, although some variation (generally no more than about 5%) is permissible. Unlike the method for preparation of cyclic polyarylates described in the aforementioned U.S. Pat. No. 4,829,144, the present method requires that the amine be employed in amounts approximating those of the diol and diacid chloride combined, rather than in catalytic amounts. Formation of an acylammonium salt by reaction of the amine with the diacid chloride is apparently a step in the process. Typical molar ratios of amine to combination of diol and diacid chloride are in the range of about 1.0–1.5:1, with 1.25:1 frequently being preferred.

The proportion of solvent employed in the reaction is not critical. In general, highest yields are obtained at concentrations of diol and diacid chloride in the range of about 0.1–0.5M.

The precise order of addition of reagents is not critical, except that the amine and diacid chloride should be prevented from coming into contact with each other prior to contact with the diol. This is necessary because the acylammonium salt which is thus formed undergoes nearly immediate decomposition by nucleophilic displacement of nitrogen from a carbon atom by the chloride ion also present in said salt.

Thus, it is possible to introduce the diol, diacid chloride and amine simultaneously into the reaction vessel, with the amine being introduced either separately or in admixture with the diol. It is also possible to introduce the diol and diacid chloride into the reaction vessel which already contains the amine, in which case the diol and diacid chloride may be introduced separately or in admixture.

It is essential that the reaction conditions be substantially anhydrous. The presence of an appreciable amount of water will cause hydrolysis of the diacid chloride or the acylammonium salt, to produce carboxylic acid which may then undergo dehydration to an anhydride. Such hydrolysis will naturally decrease the yield of cyclic polyester oligomer.

It is also essential to conduct the reaction at a temperature from about −25° to about +25° C., preferably from about −25° to about 5° C. and most preferably from about −10° to 0° C. At temperatures below about −25° C., the process becomes impractical by reason of an extremely low reaction rate. At temperatures above about +25° C., side reactions predominate; they may include decomposition of the acylammonium salt and reaction of the amine with chlorinated aliphatic hydrocarbon used as solvent, to form quaternary ammonium salts. Yields are maximized at temperatures no higher than about 5° C.

When the solvent is a chlorinated aliphatic hydrocarbon or similar material containing highly nucleophilic substituents, reaction with the amine may be relatively rapid at temperatures above about 5° C. Under such conditions, it will generally be advisable to introduce the diol, diacid chloride and amine simultaneously as previously described, so as to ensure contact between the amine and diacid chloride before the former comes into possible reactive contact with the solvent.

Following the reaction between the diacid chloride and diol, it is generally necessary to remove linear polyester in the form of oligomers and high polymer. The high polymer portion of the linears is insoluble in the solvents employed, and may be removed by filtration. Linear oligomers are most conveniently removed by column chromatography through silica gel or the like. Following the removal of high polymer and linear oligomers, the solvent may be removed and the cyclic oligomers recovered in substantially pure form.

The compositions prepared by the method of this invention are mixtures of macrocyclic polyester oligomers, of varying degrees of polymerization, usually predominantly from 2 to about 12. Major constituents most often include dimer, trimer, tetramer and pentamer.

Structural identification of the cyclic polyester oligomers was made by comparison with authentic samples isolated from commercially available linear polyesters. Thus, extraction of a commercial sample of poly(butylene terephthalate) with hot dioxane yielded about 1% by weight of a pale yellow semi-solid, from which linear oligomers were removed by flash chromatography over silica gel. Medium pressure liquid chromatography was then employed to isolate the cyclic dimer, trimer, tetramer, pentamer and hexamer from the remaining mixture.

The preparation of macrocyclic polyester oligomers is illustrated by the following examples. All percentages are by weight.

EXAMPLES 1–10

A three-necked round-bottomed flask fitted with a mechanical stirrer, nitrogen purge and septum for reagent addition was charged with 100 ml. of methylene chloride and 5.6 grams (50 mmol.) of an amine as specified hereinafter. The mixture was cooled to 0° C. and there were separately added in a nitrogen atmosphere over 30 minutes, with stirring, solutions of 20 mmol. of various diols in tetrahydrofuran and solutions of 20 mmol. of isophthaloyl or terephthaloyl chloride in 10 ml. of methylene chloride. Stirring was continued for 5 minutes after addition was completed, and then 2 ml. of methanol was added to quench the reaction. Stirring was resumed for 5 minutes, after which 50 ml. of 1M aqueous hydrochloric acid solution was added, following by another 5 minutes of stirring. The organic and aqueous layers were separated and the aqueous layer was extracted with an additional 50 ml. of methylene chloride. The combined organic solutions were filtered using a filter aid material when necessary, washed with dilute aqueous hydrochloric acid solution and aqueous sodium chloride solution, and evaporated to dryness. The products were purified by flash chromatography over silica gel, using 1–2% acetone solutions in methylene chloride as the eluant, followed by evaporation of the solvent.

The products were the desired macrocyclic polyester oligomer compositions. Molecular structures were proved by infrared and proton nuclear magnetic resonance spectroscopy and comparison with known macrocyclic oligomers.

The macrocyclic poly(butylene isophthalate) oligomer compositions began to melt at 110° C., flowed freely at 185° C. and were completely molten at 200° C. The corresponding poly(butylene terephthalate) compositions began to melt at 140° C. and became a freely flowing liquid at 190° C.

Further details are given in Tables I and II. In Table II, the amine employed in each example was DABCO. "HPLC yield" is the crude yield determined by high pressure liquid chromatography, without calibration; the lack of calibration is in part responsible for the fact that HPLC yield is sometimes lower than "isolated yield". The latter is the yield of pure cyclics obtained after column chromatography. The designation "M" for tetrahydrofuran in Table I indicates that the minimum amount required for dissolution of the diol was employed.

TABLE I

| | Example | | | | | |
|---|---|---|---|---|---|---|
| | 1 | 2 | 3 | 4 | 5 | 6 |
| Diacid chloride: | | | | | | |
| Isophthaloyl | X | — | X | X | X | — |
| Terephthaloyl | — | X | — | — | — | X |
| Diol: | | | | | | |
| Ethylene glycol | X | X | — | — | — | — |

TABLE I-continued

| | Example | | | | | |
|---|---|---|---|---|---|---|
| | 1 | 2 | 3 | 4 | 5 | 6 |
| Tetramethylene glycol | — | — | X | X | — | — |
| Hexamethylene glycol | — | — | — | — | X | X |
| Amine: | | | | | | |
| Quinuclidine | — | — | X | — | — | — |
| DABCO | X | X | — | X | X | X |
| Tetrahydrofuran, ml. | 10 | 10 | M | M | 10 | 10 |
| HPLC yield, % | 112 | 82 | 64 | 70 | 110 | 102 |
| Isolated yield, % | — | — | 50 | 63 | 55 | — |

TABLE II

| | Example | | | |
|---|---|---|---|---|
| | 7 | 8 | 9 | 10 |
| Diacid chloride: | | | | |
| Isophthaloyl | X | — | X | — |
| Diol: | | | | |
| Terephthaloyl | — | X | — | X |
| Neopentylene glycol | X | X | — | — |
| Diethylene glycol | — | — | X | X |
| HPLC yield, % | 89 | 101 | 117 | 84 |
| Isolated yield, % | 54 | — | 53 | 49 |

EXAMPLES 11–15

The procedure of Examples 1–10 was repeated using tetramethylene glycol as the diol, with the exception that a single solution in tetrahydrofuran of diol and diacid chloride was introduced. The results are given in Table III.

TABLE III

| | Example | | | | |
|---|---|---|---|---|---|
| | 11 | 12 | 13 | 14 | 15 |
| Diacid chloride: | | | | | |
| Isophthaloyl | X | X | X | — | — |
| Terephthaloyl | — | — | — | X | X |
| Amine: | | | | | |
| Quinuclidine | — | X | — | X | — |
| DABCO | X | — | — | — | X |
| N-Methylpyrrolidine | — | — | X | — | — |
| HPLC yield, % | 30 | 30 | 20 | — | 48 |

EXAMPLES 16–18

The procedure of Examples 1–10 was repeated employing tetramethylene glycol as the diol and quinuclidine as the amine, except that the diol and amine were both dissolved in tetrahydrofuran and the solution thus obtained was introduced simultaneously with a solution of the diacid chloride in methylene chloride to the reaction vessel containing only methylene chloride. The results are given in Table IV.

TABLE IV

| | Example | | |
|---|---|---|---|
| | 16 | 17 | 18 |
| Diacid chloride: | | | |
| Isophthaloyl | — | X | — |
| Terephthaloyl | X | — | X |
| HPLC yield, % | 65 | 65 | 57 |
| Isolated yield, % | — | 32 | 17 |

EXAMPLES 19–21

The procedure of Examples 16–18 was repeated, except that the amount of tetrahydrofuran employed was the minimum amount needed to dissolve the diol and amine. The results are given in Table V.

TABLE V

| | Example | | |
|---|---|---|---|
| | 19 | 20 | 21 |
| Amine: | | | |
| N-Methylpyrrolidine | X | — | — |
| DABCO | — | — | X |
| Quinuclidine | — | X | — |
| HPLC yield, % | 63 | 73 | 70 |
| Isolated yield, % | 58 | 60 | 66 |

EXAMPLES 22–25

The procedure of Examples 1–10 was repeated employing tetramethylene glycol as the diol and DABCO as the amine, except that 20 ml. of methylene chloride was employed to dissolve the diacid chloride. In Example 24, 1% excess tetramethylene glycol was employed. The results are given in Table VI.

TABLE VI

| | Example | | | |
|---|---|---|---|---|
| | 22 | 23 | 24 | 25 |
| Diacid chloride: | | | | |
| Isophthaloyl | — | X | X | — |
| Terephthaloyl | X | — | — | X |
| HPLC yield, % | 47 | 67 | 53 | 56 |
| Isolated yield, % | 66 | 82 | 72 | 75 |

According to the present invention, the macrocyclic polyester oligomer mixtures are converted to linear polyesters by contact with a macrocyclic polyester oligomer polymerization catalyst, typically in the amount of about 0.01–2.0 and preferably about 0.05–1.0 mole percent based on structural units in the oligomers. Macrocyclic polyester oligomer polymerization catalysts include basic reagents, tin alkoxides, organotin compounds (i.e., compounds containing a Sn—C bond), titanate esters and metal acetylacetonates. Compositions comprising macrocyclic polyester oligomers and catalysts of these types are another aspect of the invention. The polymers prepared from said oligomers generally have weight average molecular weights in the range of about 10,000–150,000.

Suitable basic reagents include alkali metal salicylates, alkali metal alkoxides and phosphines. Illustrative salicylates are lithium salicylate, sodium salicylate and potassium salicylate, with lithium salicylate generally being preferred. Illustrative alkoxides are the sodium and potassium $C_{1-4}$ alkoxides. Illustrative phosphines include triphenylphosphine and substituted triphenylphosphines, particularly those containing elecron-donating substituents such as tris(p-methoxyphenyl)phosphine.

Illustrative tin alkoxides are those containing $C_{1-4}$ alkyl groups; they include stannous methoxide, ethoxide and propoxides. Illustrative organotin compounds are dialkyltin(IV) oxides such as di-n-butyltin(IV) oxide and di-n-octyltin(IV) oxide, as well as di-alkyltin(IV) dialkoxides such as di-n-butyltin(IV) di-n-butoxide and heterocyclic analogs thereof such as 2,2-di-n-butyl-2-stanna-1,3-dioxacycloheptane. Illustrative titanate esters are isopropyl titanate and 2-ethylhexyl titanate.

The metal acetylacetonates are illustrated by ferric acetylacetonate and cobalt(III) acetylacetonate. They are often advantageously employed in two-component catalyst systems in combination with an aliphatic alcohol, especially a diol such as 1,12-dodecanediol. The metal acetylacetonate and alcohol are generally employed in approximately equimolar proportions. Such two-component catalyst systems may be advantageous in situations where close control of the time of polymerization is necessary, as in resin transfer molding where two liquid streams, each containing one of the catalyst components, may be fed into the mold. Under such conditions, polymerization cannot take place until the time of contact of the two streams within the mold.

As previously stated, the temperature of conversion of the macrocyclic oligomers to linear polyesters may be in the range of about 160°–300° C. It is frequently preferred for polymerization to take place above the temperature at which the oligomers are completely melted but below the melting temperature of the crystalline linear polyester obtained as product. In the case of macrocyclic poly(ethylene terephthalate) and poly(butylene terephthalate) oligomers, that is in the range of about 160°–260° and about 160°–220° C., respectively. The polymerization product can then crystallize spontaneously upon formation and release itself from the mold, permitting an essentially isothermal polymerization process without the necessity of a cooling step before demolding.

It is generally found that the rate of crystallization of poly(butylene terephthalate) reaches a maximum in the neighborhood of 170° C. Under certain circumstances, said crystallization may inhibit further polymerization of the macrocyclic polyester oligomers. Therefore, in an especially preferred embodiment of the invention the polymerization of macrocyclic poly(butylene terephthalate) oligomers is conducted at temperatures within the range of about 175°–200° C. to ensure rapid polymerization followed by relatively slower crystallization.

The previously mentioned Goodman et al. paper discloses the isolation of individual poly(ethylene terephthalate) oligomers from linear polyester, and polymerization of said oligomers by heating with antimony oxide at temperatures in the range of 275°–306° C. It does not, however, disclose catalysts in the above-described classes, polymerization of other macrocyclic polyester oligomers or polymerization of oligomer mixtures. Moreover, it does not disclose polymerization between the melting point of the oligomer and the melting temperature of the crystalline polyester product.

The method of this invention is illustrated by the following examples.

EXAMPLE 26

Samples of macrocyclic poly(butylene isophthalate) oligomers were heated in an argon atmosphere at 210° C. until melted, intimately blended with 1.0 mole percent of various catalysts and converted to linear polyesters by heating for 15 minutes at various temperatures. The results are given in Table VII.

TABLE VII

| Catalyst | Temperature, °C. | Linear polyester Percent | Mw |
|---|---|---|---|
| Lithium salicylate | 250 | 16 | 17,500 |
| " | 275 | 51 | 39,700 |
| Di-n-butyltin oxide | 200 | 51 | 68,100 |
| " | 250 | 86 | 65,700 |
| " | 275 | 90 | 42,100* |
| Di-n-octyltin oxide | 200 | 49 | 53,200 |
| " | 250 | 93 | 61,500 |
| " | 275 | 88 | 43,000 |
| Stannous methoxide | 250 | 54 | 36,000 |
| " | 275 | 72 | 31,300 |
| Stannous ethoxide | 250 | 59 | 37,500 |
| " | 275 | 79 | 35,600 |
| Di-n-butyltin di-n-butoxide | 200 | 95 | 63,100 |
| " | 250 | 90 | 33,300 |
| " | 275 | 96 | 34,200 |
| 2,2-Di-n-butyl-2-stanna-1,3-dioxacycloheptane | 200 | 56 | 55,000 |
| 2,2-Di-n-butyl-2-stanna-1,3-dioxacycloheptane | 250 | 76 | 38,900 |
| 2,2-Di-n-butyl-2-stanna-1,3-dioxacycloheptane | 275 | 97 | 45,300 |

*4% gel also formed.

EXAMPLE 27

The procedure of Example 26 was repeated, substituting macrocyclic poly(butylene terephthalate) oligomers for the poly(butylene isophthalate) oligomers and employing various catalysts and catalyst levels and various time periods. The results are given in Table VIII.

TABLE VIII

| Catalyst Identity | Mole % | Temperature, °C. | Time, min. | Linear polyester Percent | Mw |
|---|---|---|---|---|---|
| Di-n-butyl-tin di-n-butoxide | 0.5 | 275 | 10 | 97 | 58,900 |
| Sodium ethoxide | 1.0 | 225 | 10 | 41 | 5,300 |
| Isopropyl titanate | 0.2 | 210 | 10 | 98 | 115,000 |
| Ferric acetylacetonate | 1.0 | 225 | 4 | 26 | 44,800 |
| Ferric acetylacetonate-1,12-dodecaneiol | 1.0* | 225 | 4 | 92 | 19,800 |
| 2-Ethylhexyl titanate | 0.2 | 225 | 10 | 98 | 115,000 |
| 2,2-Di-n-butyl-2-stanna-1,3-dioxacycloheptane | 1.0 | 200 | 10 | 97 | 63,400 |
| Tris(p-methoxy- | 1.0 | 225 | 10 | 40 | 25,800 |

TABLE VIII-continued

| Catalyst | | Temperature, | Time, | Linear polyester | |
|---|---|---|---|---|---|
| Identity | Mole % | °C. | min. | Percent | Mw |
| phenyl)-phosphine | | | | | |

*For each catalyst constituent.

EXAMPLE 28

The procedure of Example 27 was repeated, employing various polymerization catalysts at 1.0 mole percent. The time of polymerization was 15 minutes. The results are given in Table IX.

TABLE IX

| | Temperature, | Linear polyester | |
|---|---|---|---|
| Catalyst | °C. | Percent | Mw |
| Lithium salicylate | 275 | 51 | 39,700 |
| Di-n-butyltin oxide | 250 | 86 | 65,700 |
| Stannous methoxide | 250 | 54 | 36,000 |
| Di-n-butyltin di-n-butoxide | 200 | 95 | 63,100 |

EXAMPLE 29

The procedure of Example 27 was repeated, employing 2,2-di-n-butyl-2-stanna-1,3-dioxacycloheptane at 1.0 mole percent and various temperatures, and a polymerization time of 10 minutes. The results are given in Table X.

TABLE X

| | Linear polyester | |
|---|---|---|
| Temperature, °C. | Percent | Mw |
| 170 | 91 | 73,400 |
| 180 | 97 | 70,300 |
| 190 | 98 | 70,300* |
| 200 | 98 | 68,900* |

*Did not crystallize.

What is claimed is:

1. A method for converting a mixture consisting essentially of macrocyclic polyester oligomers comprising structural units of the formula

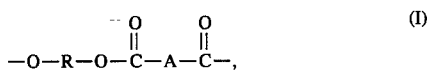

$$-O-R-O-\overset{O}{\underset{\|}{C}}-A-\overset{O}{\underset{\|}{C}}-, \qquad (I)$$

wherein R is an alkylene or mono- or polyoxyalkylene radical containing a straight chain of about 2–8 atoms and A is an m- or p-linked monocyclic aromatic or alicyclic radical, to a linear polyester which comprises contacting said mixture with a macrocyclic polyester oligomer polymerization catalyst at a temperature within the range of about 160°–300° C.

2. A method according to claim 1 wherein the catalyst is a basic reagent, stannous alkoxide, organotin compound, titanate ester or metal acetylacetonate.

3. A method according to claim 2 wherein the catalyst is employed in the amount of about 0.01–2.0 mole percent based on structural units in the oligomers.

4. A method according to claim 3 wherein R is ethylene or tetramethylene and A is m- or p-phenylene.

5. A method according to claim 4 wherein the catalyst is an alkali metal salicylate, alkali metal alkoxide or triarylphosphine.

6. A method according to claim 4 wherein the catalyst is a stannous alkoxide containing $C_{1-4}$ alkyl groups.

7. A method according to claim 4 wherein the catalyst is a dialkyltin(IV) oxide, a dialkyltin(IV) dialkoxide or a heterocyclic analog thereof.

8. A method according to claim 7 wherein the catalyst is 2,2-di-n-butyl-2-stanna-1,3-dioxacycloheptane.

9. A method according to claim 4 wherein the catalyst is a titanate ester.

10. A method according to claim 4 wherein the catalyst is a metal acetylacetonate or a combination thereof with an aliphatic alcohol.

11. A method according to claim 10 wherein the catalyst is an equimolar mixture of ferric acetylacetonate and 1,12-dodecanediol.

12. A method according to claim 4 wherein A is p-phenylene.

13. A method according to claim 12 wherein R is tetramethylene.

14. A method according to claim 13 wherein the catalyst is employed in the amount of about 0.05–1.0 mole percent based on structural units in the oligomers.

15. A method according to claim 4 wherein the polymerization temperature is above the temperature at which the oligomers are completely melted but below the melting temperature of the crystalline linear polyester.

16. A method according to claim 15 wherein A is p-phenylene.

17. A method according to claim 16 wherein R is tetramethylene.

18. A method according to claim 17 wherein the temperature is in the range of about 160°–220° C.

19. A method according to claim 17 wherein the temperature is in the range of about 175°–200° C.

20. A composition consisting essentially of a mixture of macrocyclic polyester oligomers comprising structural units of the formula

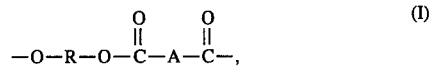

$$-O-R-O-\overset{O}{\underset{\|}{C}}-A-\overset{O}{\underset{\|}{C}}-, \qquad (I)$$

wherein R is an alkylene or mono- or polyoxyalkylene radical containing a straight chain of about 2–8 atoms and A is an m- or p-linked monocyclic aromatic or alicyclic radical, and a macrocyclic polyester oligomer polymerization catalyst.

21. A composition according to claim 20 wherein the catalyst is a basic reagent, stannous alkoxide, organotin compound, titanate ester or metal acetylacetonate.

22. A composition according to claim 21 wherein the catalyst is present in the amount of about 0.01–2.0 mole percent based on structural units in the oligomers.

23. A composition according to claim 22 wherein R is ethylene or tetramethylene and A is m- or p-phenylene.

24. A composition according to claim 23 wherein the catalyst is an alkali metal salicylate, alkali metal alkoxide or triarylphosphine.

25. A composition according to claim 23 wherein the catalyst is a stannous alkoxide containing $C_{1-4}$ alkyl groups.

26. A composition according to claim 23 wherein the catalyst is a dialkyltin(IV) oxide, a dialkyltin(IV) dialkoxide or a heterocyclic analog thereof.

27. A composition according to claim 23 wherein the catalyst is a titanate ester.

28. A composition according to claim 23 wherein the catalyst is a metal acetylacetonate or a combination thereof with an aliphatic alcohol.

29. A composition according to claim 23 wherein A is p-phenylene.

30. A composition according to claim 29 wherein R is tetramethylene.

31. A composition according to claim 30 wherein the catalyst is present in the amount of about 0.05–1.0 mole percent based on structural units in the oligomers.

* * * * *